United States Patent [19]

Hartemann

[11] 4,317,372
[45] Mar. 2, 1982

[54] SURFACE ACOUSTIC WAVE PRESSURE GAUGE

[75] Inventor: Pierre Hartemann, Paris, France

[73] Assignee: Thomson-CSF, Paris, France

[21] Appl. No.: 127,748

[22] Filed: Mar. 6, 1980

[30] Foreign Application Priority Data

Mar. 9, 1979 [FR] France ................. 79 06134

[51] Int. Cl.³ ............................ G01L 11/00
[52] U.S. Cl. ..................... 73/703; 73/DIG. 4
[58] Field of Search ............ 73/DIG. 4, 702, 703, 73/723, 654, 609, 658

[56] References Cited

U.S. PATENT DOCUMENTS

| | | | |
|---|---|---|---|
| 3,858,064 | 12/1974 | Schissler | 73/DIG. 4 |
| 3,878,477 | 4/1975 | Fleming et al. | 73/DIG. 4 |
| 3,888,115 | 6/1975 | Schwartz | 73/DIG. 4 |
| 3,978,731 | 9/1976 | Reeder et al. | 73/DIG. 4 |
| 4,096,740 | 6/1978 | Sallee | 73/DIG. 4 |
| 4,100,811 | 7/1978 | Cullen et al. | 73/654 |
| 4,107,626 | 8/1978 | Kiewit | 73/DIG. 4 |
| 4,227,182 | 10/1980 | Ogasawara et al. | 73/DIG. 4 |

*Primary Examiner*—Donald O. Woodiel
*Attorney, Agent, or Firm*—Oblon, Fisher, Spivak, McClelland & Maier

[57] ABSTRACT

The present invention relates to a pressure gauge of the type comprising a piezoelectric substrate one face of which is polished and carried two delay lines using interdigital combs forming part of two oscillators whose output signals are mixed. The gauge comprises a two-part case communicating with a pressure gauge inlet, a piezoelectric wafer fixed by its edges to a support, the whole forming a sealed dividing wall with respect to the fluid contained in the inlet, this latter exerting its pressure on the non-polished face of the wafer. A printed circuit carrying the required electronic circuits is connected to the delay lines and inserted between the two parts of the case. A protection device may be provided for avoiding contact between the polished face and polluted air, while maintaining constant pressure on this face.

12 Claims, 7 Drawing Figures

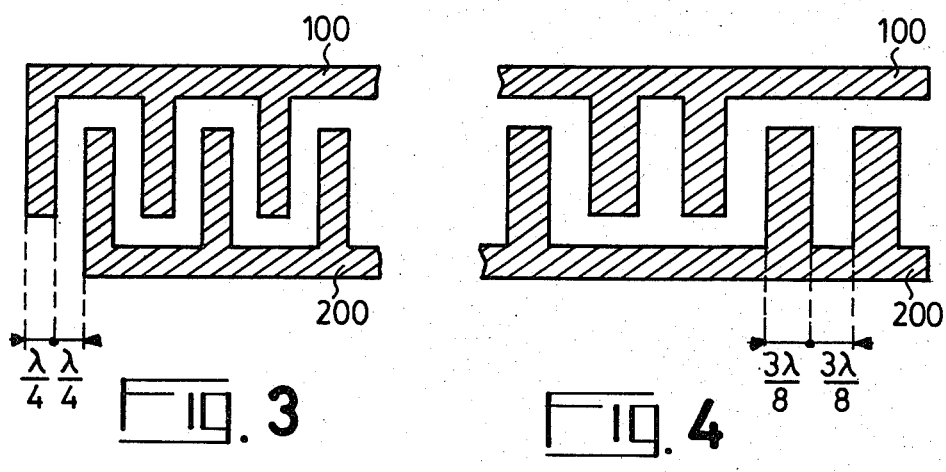
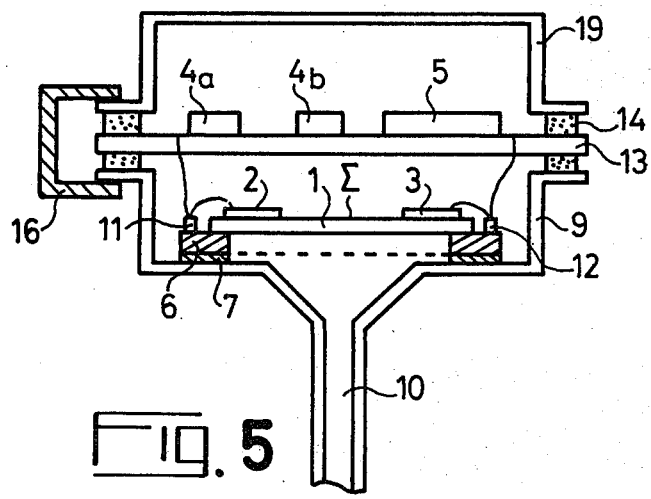

4,317,372

SURFACE ACOUSTIC WAVE PRESSURE GAUGE

FIELD OF THE INVENTION

The present invention relates to a surface acoustic wave pressure gauge.

It is known to use surface acoustic waves propagated between two interdigital comb transducers in a piezoelectric substrate for measuring accelerations, stresses and pressures exerted on a thinned-down portion of this substrate. For this purpose, the delay line formed between the two transducers is looped on itself by means of an amplifier and forms an oscillator whose frequency varies as a function of the strain and stress changes in the material, these latter causing variations in the propagation time of the surface waves. To compensate for the effect of temperature drifts which also influence the oscillation frequency, it is also known to form two similar oscillators comprising respectively two delay lines deposited on the same substrate and located thereon so that a temperature variation produces in each line a variation in propagation time in the same direction whereas a variation of the stress applied to the thinned-down part of the substrate produces variations in opposite directions. By applying the output signals from the two oscillators to a mixer, a signal is obtained whose frequency variation due to the stress is the sum of the frequency variations in each oscillator, whereas the effects of the temperature variations are very much reduced if not cancelled out.

A device of this kind is described for example in U.S. Pat. No. 4,100,811. In this patent, the two delay lines are disposed at the surface of a piezoelectric substrate hollowed out at its center to form a thin circular zone in which electric and acoustic energies may be exchanged.

SUMMARY OF THE INVENTION

The invention proposes using such results for carrying out depression measures in relation to the atmospheric pressure. It may in particular be used for controlling the ignition advance of a motor-driven vehicle. The apparatus of the invention comprises a thin piezoelectric wafer of uniform thickness one face of which is subjected to the pressure p of a fluid and fixed rigidly at its periphery to a support whose expansion coefficient is such that it creates no thermal strain or stress within the wafer. The support is itself fixed to the shell of an enclosure communicating with the pressure gauge inlet containing the fluid so as to avoid any contact between the fluid and the second face of the wafer, this latter being a polished face on which are deposited tranducers forming delay lines. The second face of the wafer may be subjected to the pressure of the ambient air $p_0$. The wafer is connected to a printed circuit comprising all the electronic circuits required; the whole is contained in a closed enclosure so that the atmospheric pressure to which the polished face of the wafer is subjected remains constant. Additional means may be provided for avoiding pollution of the polished face.

The above and other objects, features and advantages of the present invention will become apparent from the following description, given solely by way of non-limiting illustration, when taken in conjunction with the accompanying drawings.

DESCRIPTION OF THE DRAWINGS

FIGS. 3 and 4 show two possible tranducer configurations.

FIG. 5 shows a pressure gauge in accordance with the invention.

DESCRIPTION OF THE PREFERRED EMBODIMENTS

Figures 1, 2:
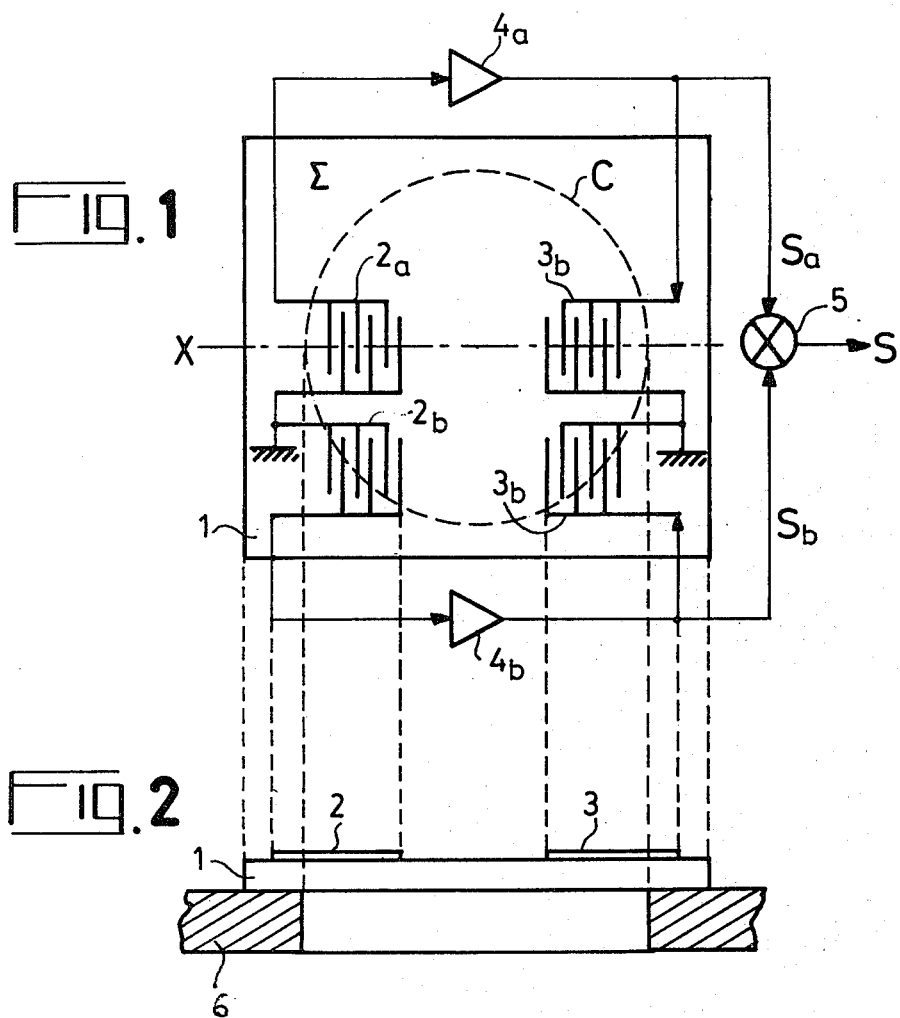
FIGS. 1 and 2 illustrate the operation of the gauge of the invention.

FIGS. 1 and 2 show respectively in a top view and in a section a surface acoustic wave pressure gauge. This gauge comprises a piezoelectric substrate, for example made from quartz, forming a thin wafer 1 of any shape, for example rectangular, whose edges (the 4 sides in the case of a rectangular wafer) are bonded rigidly by means of a hard or flexible adhesive to a support 6 formed from a different material than the wafer and whose expansion coefficient is such that it creates no thermal strain or stress likely to falsify the measurement. The shape of thin support leaves a central circular recess whose projection C on the wafer is shown in FIG. 1 by a broken line. The area inside this circle forms the useful part of wafer 1. For enabling surface acoustic waves to propagate over the upper surface $\Sigma$ of the wafer shown in FIG. 1, i.e. the face opposite that whose edges are bonded to the support, this face is polished. In the useful zone two delay lines are formed, one having an axis X passing through the center of circle C and formed between two transducers $2a$ and $3a$, the other formed between two transducers $2b$ and $3b$, with parallel axis X, disposed close to the periphery of the useful area, so that the effects of a pressure difference between the two faces on the stresses and strains imposed on the corresponding areas of the wafer therefore on the propagation time of the waves, are in opposite directions for the two lines. The transducers are formed for example by aluminium fingers disposed by photoetching. Two independent oscillators are formed by looping the lines respectively by means of amplifier circuits $4a$ and $4b$. The signals emitted by the amplifiers: Sa and Sb have frequencies Fa and Fb which vary in the opposite direction when the pressure difference varies. These signals are mixed in a mixer 5 which supplies the output signal S, of a frequency Fa−Fb. Thus, the frequency differences in the two lines due to the depression, which are of opposite signs, are added together whereas those due to heat drifts, which are of the same sign, are subtracted from one another.

The transducers between which the delay lines are formed are constituted by interdigital combs able to be formed by conventional photolithographic processes. A conventional transducer configuration is shown in FIG. 3. The fingers of combs 100 and 200 are formed by equidistant metal strips of constant length. The distance between two consecutive strips is divided almost equally between the metallized part and the non-metallized gap and is equal to $\lambda/2$ where $\lambda$ is the wavelength of the acoustic waves propagated at the surface of the piezoelectric substrate. Another configuration is shown in FIG. 4. In this variation, each finger of combs 100 and 200 is formed by two metal strips of a width $3\lambda/8$, separated by gaps also of a width $3\lambda/8$, so that the distance between two consecutive fingers is equal to $3\lambda/2$. Thus, the waves coupled by means of this transducer are third harmonics. This configuration presents two main advantages over the preceding one: it avoids the effect of reflections on the fingers since the waves reflected by two successive strips, instead of being in phase, are opposite in phase and cancel each other out. Furthermore, the metal strips are wider and so more easily formed. For the invention, the second configuration will then be preferred to the first one, either for one of the transducers of each line, or for both.

FIG. 5 shows a section of a pressure gauge in accordance with the invention. The main element of this gauge is a piezoelectric wafer of the type previously described. The different elements of the gauge are contained in an enclosure defined by two cases 9 and 19 which are assembled after inserting the different elements. The edges of wafer 1 are bonded to a support 6. This support 6 is itself bonded by means of a flexible adhesive to the base of case 9. The space defined by case 9, support 6 and wafer 1 communicates with a pressure gauge inlet 10 containing a fluid whose pressure p, either absolute, or differential in relation to the atmospheric pressure for example, it is desired to measure. Support 6 is fixed to case 9 so as to obtain a perfect seal between the contents of inlet 10 and the enclosure defined by the space included between cases 9 and 19 above wafer 1. The fluid contained in inlet 10 is in contact with the face of wafer 1 opposite the polished surface $\Sigma$, this face $\Sigma$ carries the transducers whose outlines 2 and 3 can be seen in the figure forming the delay lines such as described above. In the enclosure there is also placed a printed circuit 13 which is fixed by its edges between the two flattened rims of cases 9 and 19. These latter are assembled by means of seals 14 ensuring good sealing and possibly other assembly means 16. The printed circuit 13 carries different electronic circuits, for example the amplifiers 4a and 4b and the mixer means 5 shown in FIG. 1. This printed circuit 13 is then to be connected electrically to the input-output transducers of the delay lines. This connection may be made by means of studs 11 and 12 disposed on support 6 at the side of wafer 1. The operation of the gauge is clear from the results given above. On the same side as the pressure gauge inlet 10, a pressure p is exerted on the lower face of wafer 1. On the other face $\Sigma$ there is for example exerted a pressure $p_0$. The pressure difference $p-p_0$ causes deformation of the wafer in opposite directions for the two lines, causing frequency variations $\Delta Fa$ and $\Delta Fb$ with opposite signs. The output signal S taken from mixer 5 has for frequency $Fa-Fb+\Delta Fa-\Delta Fb$, this signal may be filtered so as to obtain only the frequency $\Delta Fa-\Delta Fb$. Thus, the pressure difference $p-p_0$ is determined. To determine the exact value of p it is necessary to know the pressure $p_0$. The device shown in FIG. 5 comprises a closed case 19 so that the volume of air contained above wafer 1 varies when wafer 1 is deformed. The result is a variation of pressure $p_0$. The device shown in FIG. 5 can only be used in the case where the enclosure contained between the cases 9 and 19 is evacuated. Thus the measurement of the absolute pressure p is obtained.

Figure 6:
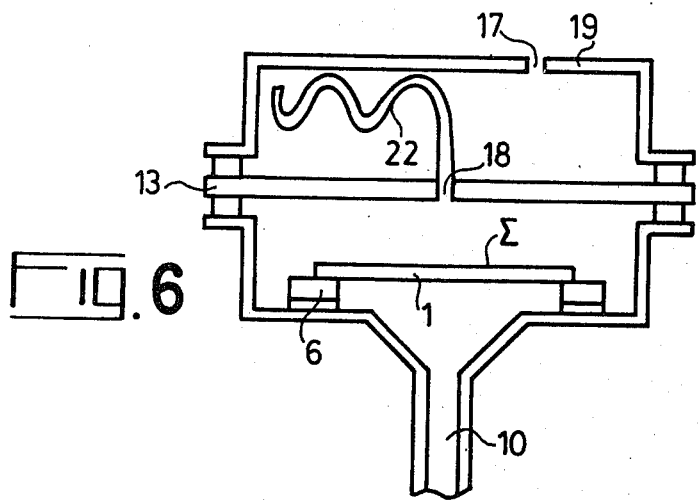
FIGS. 6 and 7 show other embodiments of the invention.

In the more usual case where it is desired to measure a depression in relation to the atmospheric pressure, there must be provided in case 19 an air inlet so that the pressure to which the face $\Sigma$ of wafer 1 is subjected is the pressure of the ambient air. The device obtained is shown in FIG. 6. It is similar to that of FIG. 5 except for the following points: a pressure-balancing orifice 17 is provided in case 19 and the printed circuit 13 has therethrough a hole 18, for example centrally. A problem arises in this case when the ambient air is charged with dust or other forms of pollution, in fact this dust by settling on the polished face $\Sigma$ of wafer 1 risks deteriorating the signals obtained. It is then necessary to isolate in one way or another surface $\Sigma$ from any form of pollution, either by filtering the air which reaches this face, or by placing a material above the surface $\Sigma$ transmitting the whole of pressure $p_0$, but preventing dust from reaching surface $\Sigma$. One of the possible solutions is shown in FIG. 6. It is a snake-like air filter 22 one orifice of which communicates with the hole 18 of printed circuit 13 while the other orifice communicates with the upper part of the enclosure. The dust contained in the air settles on the walls of the filter and the air which arrives in the lower part of the enclosure, i.e. in contact with surface $\Sigma$, is dust-free. The device of FIG. 6 was formed with a Y-cut quartz wafer deposited on a stainless steel or alumina ceramic support 6 having a useful part 1 cm in diameter. The wafer has a thickness of 250 microns. Cases 9 and 19 are made from plastic, as well as inlet 10 which may also be pressed from sheet metal. Printed circuit 13 is a ceramic wafer. The electronic circuits which are placed thereon are integrated circuits of a current type. The central frequency of the oscillators is adjusted to about 105 MHz. This adjustment may be made by a slight variation in the length of the connections in the loop of one of the oscillators or of both. A sensitivity of 40 kHz/bar has been obtained. The frequency of the output signal of the gauge is a few tens of kHz for a maximum measured differential pressure of 2 bars so as to obtain good linearity of the measurement.

Figure 7:
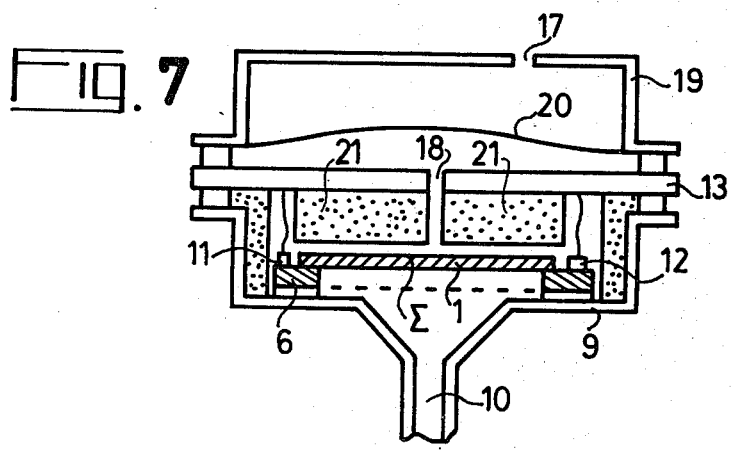

Another way of getting rid of the pollution problems is shown in FIG. 7. It consists in placing above printed circuit 13 a flexible membrane 20 fixed for example in case 9 and preventing any communication of air between the part situated above and the part situated below. So that the pressure variations between the two parts do not cause too great a deformation of the membrane, it is preferable for the volume of air contained below the membrane to be as small as possible. To this end, it is possible to fill this volume with a filling material 21 except for a free space left above surface $\Sigma$ and passages for the connections between the transducers and printed circuit 13.

The gauge of the invention finds its application particularly in the motor vehicle field. It may be used especially to regulate the ignition advance control of a motor-driven vehicle. In this case, the fluid arriving in inlet 10 is pressurized air.

It is apparent that within the scope of the invention, modifications and different arrangements can be made other than are here disclosed. The present disclosure is merely illustrative with the invention comprehending all variations thereof.

What is claimed is:

1. A surface acoustic wave pressure gauge, of the type comprising a piezoelectric substrate having two faces, two delay lines using interdigital combs being formed on a first face at positions where pressure variations between the two faces produce deformations of opposite signs, and forming respectively part of two oscillators whose output signals are mixed so as to obtain the difference of their frequency, wherein the substrate is formed by a wafer of uniform thickness carried by the upper plane face of a support having a central recess communicating with a pressure gauge inlet, said support being formed from a material whose expansion coefficient is such that it creates no thermal stress or strain within the wafer, said wafer capping said central recess and being glued to said upper face with a sealing joint.

2. A surface acoustic wave pressure gauge, of the type comprising a piezoelectric substrate having two faces, two delay lines using interdigital combs being formed on a first face at positions where pressure variations between the two faces produce deformations of opposite signs, and forming respectively part of two oscillators whose output signals are mixed so as to obtain the difference of their frequency, wherein the substrate is formed by a wafer of uniform thickness whose edges are maintained rigidly in place on a support having a central recess and being formed from a material whose expansion coefficient is such that it creates no thermal stress or strain within the wafer, and wherein a two-part case is further provided, a first part of which is connected to a pressure gauge inlet containing a fluid whose pressure is to be measured, the support being fixed to this first part so that the support-wafer assembly forms a sealed dividing wall with respect to the fluid and so that this latter exerts a pressure on the second face of the wafer, a printed circuit carrying amplifier means and mixer means being introduced between the two parts of the case and connected electrically to the delay lines so as to supply a signal as a function of the pressure to be measured.

3. A pressure gauge as claimed in claim 2, wherein a pressure-balancing orifice is provided in the second part of the case so that the gauge operates as a depressionmeter.

4. A pressure gauge as claimed in claim 3, wherein protecting means are further provided for avoiding pollution of the first face of the wafer.

5. A pressure gauge as claimed in claim 4, wherein the protecting means comprise a snake-like device communicating with a hole provided in the printed circuit so as to form a decantation chamber so that the air in contact with the first face of the wafer is free of dust.

6. A pressure gauge as claimed in claim 4, wherein the protecting means comprise a flexible membrane forming a sealed dividing wall between the balancing orifice and the first face of the wafer and transmitting the whole of the pressure exerted on its faces.

7. A pressure gauge as claimed in claim 2, wherein the inside of the case is exhausted so that the output signal is a function of the pressure of the fluid.

8. A pressure gauge as claimed in any one of claims 2 and 3-7, wherein the support is made from a stainless steel.

9. A pressure gauge as claimed in any one of claims 2 and 3-7, wherein the support is made from alumina ceramic.

10. A pressure gauge as claimed in any one of claims 2 and 3-9, wherein the wafer is made from quartz.

11. A pressure gauge as claimed in any one of claims 2 and 3-10, wherein the teeth of the combs are formed by depositing aluminium strips on the wafer.

12. A pressure gauge as claimed in any one of claims 2 and 3-11, wherein each finger of the combs of one at least of the transducters of each line is formed by two metal strips of a width equal to $3\lambda/8$, two consecutive strips being separated by a gap of a width $3\lambda/8$, being the wavelength of the fundamental mode capable of being propagated in the piezoelectric substrate.

* * * * *